(12) United States Patent
    Li

(10) Patent No.: US 10,798,643 B2
(45) Date of Patent: Oct. 6, 2020

(54) SIGNAL SENDING METHOD AND DEVICE

(71) Applicant: Huawei Technologies Co., Ltd., Shenzhen (CN)

(72) Inventor: Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 14/868,356

(22) Filed: Sep. 28, 2015

(65) Prior Publication Data

US 2016/0021602 A1    Jan. 21, 2016

Related U.S. Application Data

(63) Continuation of application No. PCT/CN2014/074458, filed on Mar. 31, 2014.

(30) Foreign Application Priority Data

Mar. 29, 2013  (CN) .......................... 2013 1 0110033

(51) Int. Cl.
    *H04B 7/185*      (2006.01)
    *H04W 48/16*      (2009.01)
    (Continued)

(52) U.S. Cl.
    CPC ......... *H04W 48/16* (2013.01); *H04L 41/0803* (2013.01); *H04W 24/10* (2013.01); *H04W 48/12* (2013.01); *H04W 84/045* (2013.01)

(58) Field of Classification Search
    CPC ... H04W 48/16; H04W 24/10; H04W 84/045; H04W 24/08; H04W 72/042;
    (Continued)

(56) References Cited

U.S. PATENT DOCUMENTS 6,240,124 B1 *  5/2001  Wiedeman ......... H04B 7/18543
                                                    370/318
7,567,791 B2 *  7/2009  Laroia ............... H04W 52/0235
                                                    455/343.2
(Continued)

FOREIGN PATENT DOCUMENTS

CN        101415228 A      4/2009
CN        101822091 A      9/2010
                (Continued)

OTHER PUBLICATIONS

"3$^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.7.0, pp. 1-101, 3$^{rd}$ Generation Partnership Project, Valbonne, France (Feb. 2013).

(Continued)

*Primary Examiner* — Hanh N Nguyen
(74) *Attorney, Agent, or Firm* — Leydig, Voit & Mayer, Ltd.

(57) ABSTRACT

The present invention provides a signal sending method and device. The method includes: sending a first discovery reference signal to first user equipment by using a first transmit power and a first transmit period, where the first discovery reference signal is used by the first user equipment for signal quality measurement; sending a second discovery reference signal to second user equipment by using a second transmit power and a second transmit period, where the second discovery reference signal is used by the second user equipment for signal quality measurement; and receiving a first signal measurement result of the first user equipment for the first discovery reference signal, and receiving a second signal measurement result of the second user equipment for the second discovery reference signal.

19 Claims, 10 Drawing Sheets

(51) Int. Cl.
*H04W 24/10* (2009.01)
*H04L 12/24* (2006.01)
*H04W 48/12* (2009.01)
*H04W 84/04* (2009.01)

(58) Field of Classification Search
CPC ........... H04W 56/001; H04W 74/0833; H04W 76/046; H04W 76/068; H04W 52/0206; H04W 52/265; H04W 52/0235; H04W 36/22; H04L 12/24; H04L 41/0803; H04L 5/005; H04L 5/0051; H04B 17/327; H04B 17/318
See application file for complete search history.

(56) References Cited

U.S. PATENT DOCUMENTS

| | | | |
|---|---|---|---|
| 9,042,901 B2* | 5/2015 | Macias | H04W 52/0206 370/331 |
| 9,060,328 B2* | 6/2015 | Marinier | H04W 36/22 |
| 2010/0027510 A1 | 2/2010 | Balasubramanian et al. | |
| 2010/0248735 A1 | 9/2010 | Hamabe et al. | |
| 2012/0213109 A1 | 8/2012 | Xu et al. | |
| 2014/0106759 A1 | 4/2014 | Geng et al. | |
| 2015/0326356 A1* | 11/2015 | Guan | H04J 11/0093 370/330 |
| 2016/0345247 A1* | 11/2016 | Kim | H04W 48/16 |

FOREIGN PATENT DOCUMENTS

| | | |
|---|---|---|
| CN | 102113385 A | 6/2011 |
| CN | 102123459 A | 7/2011 |
| CN | 102857940 A | 1/2013 |
| CN | 102883408 A | 1/2013 |
| EP | 2876941 A1 | 5/2015 |
| WO | 2011130989 A1 | 10/2011 |

OTHER PUBLICATIONS

"LTE; Evolved Universal Terrestrial Radio Access (E-UTRA); Potential solutions for energy saving for E-UTRAN (3GPP TR 36.927 version 10.1.0 Release 10)," ETSI TR 136 927, V10.1.0, pp. 1-23, European Telecommunications Standard Institute, Sophia-Antipolis, France (Oct. 2011).

"On Time and Frequency Synchronization on Additional Carrier Types," 3GPP TSG RAN WG1 Meeting #66bis, Zhuhai, China, R1-112926, 3$^{rd}$ Generation Partnership Project, Valbonne, France (Oct. 10-14, 2011).

"Discussion on dual dormant/active state cells and cell discovery," 3GPP TSG RAN WG1 Meeting #72, St. Julian's, Malta, R1-130447, 3$^{rd}$ Generation Partnership Project, Valbonne, France (Jan. 28-Feb. 1, 2013).

"Discussion on common solution to support efficient operation for Rel-12," 3GPP TSG-RAN WG1 #72, St. Julian's, Malta, R1-130537, 3$^{rd}$ Generation Partnership Project, Valbonne, France (Jan. 28-Feb. 1, 2013).

* cited by examiner

| Send a first discovery reference signal to first UE by using a first transmit power and a first transmit period, where the first discovery reference signal is used by the first UE for signal quality measurement; and send a second discovery reference signal to second UE by using a second transmit power and a second transmit period, where the second discovery reference signal is used by the second UE for signal quality measurement | 301 |

↓

| Receive a first signal measurement result of the first UE for the first discovery reference signal, and receive a second signal measurement result of the second UE for the second discovery reference signal | 302 |

FIG. 3A

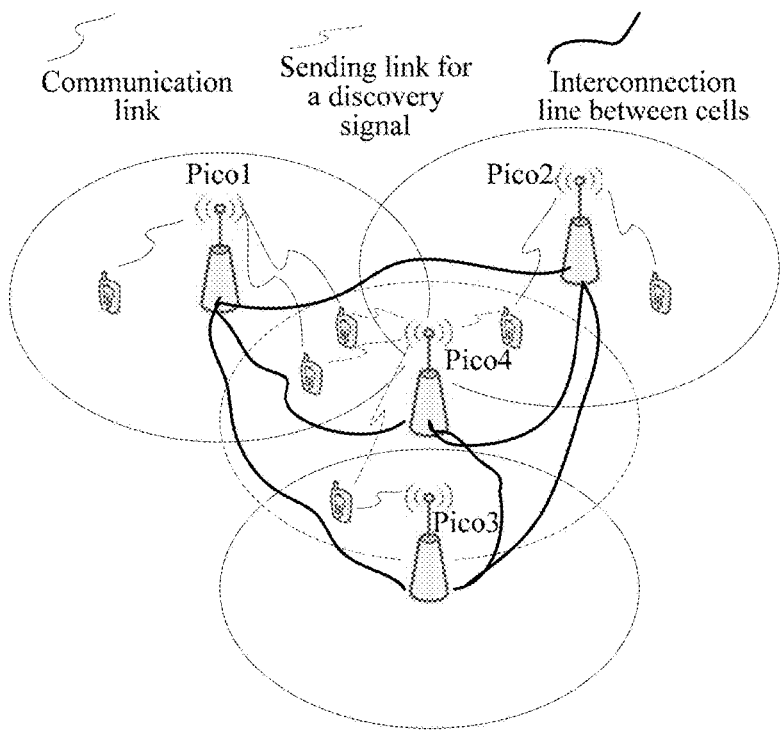

FIG. 3B

| A first transmit site sends a first discovery reference signal to first UE by using a first transmit power and a first transmit period, where the first discovery reference signal is used by the first UE for signal quality measurement; and sends a second discovery reference signal to second UE by using a second transmit power and a second transmit period, where the second discovery reference signal is used by the second UE for signal quality measurement | 301 |

↓

| The first transmit site sends, to a second transmit site, configuration information 1 corresponding to the DsRS 1, and configuration information 2 corresponding to the DsRS 2; and the second transmit site sends first configuration information to the first UE according to the configuration information 1, and sends second configuration information to the second UE according to the configuration information 2, so that the first UE acquires a first signal measurement result of the first UE according to the first configuration information and the DsRS 1, and the second UE acquires a second signal measurement result of the second UE according to the second configuration information and the DsRS 2 | 302a |

↓

| The first transmit site receives the first signal measurement result of the first UE for the first discovery reference signal, receives the second signal measurement result of the second UE for the second discovery reference signal, and determines, according to the first signal measurement result and the second signal measurement result, whether to switch an operation mode | 3021a |

FIG. 3C

A first transmit site sends a first discovery reference signal to first UE by using a first transmit power and a first transmit period, where the first discovery reference signal is used by the first UE for signal quality measurement; and sends a second discovery reference signal to second UE by using a second transmit power and a second transmit period, where the second discovery reference signal is used by the second UE for signal quality measurement ⟶ 301

The first transmit site sends, to a second transmit site, configuration information 1 corresponding to the DsRS 1, and configuration information 2 corresponding to the DsRS 2; and the second transmit site sends first configuration information to the first UE according to the configuration information 1, and sends second configuration information to the second UE according to the configuration information 2, so that the first UE acquires a first signal measurement result of the first UE according to the first configuration information and the DsRS 1, and the second UE acquires a second signal measurement result of the second UE according to the second configuration information and the DsRS 2 ⟶ 302a The first transmit site receives the first signal measurement result of the first UE and the second signal measurement result of the second UE that are sent by the second transmit site, where the second transmit site is a site that directly receives the first signal measurement result acquired by the first UE and directly receives the second signal measurement result acquired by the second UE ⟶ 3021b

FIG. 3D

```
┌─────────────────────────────────────────────────────────────────────┐
│  A control device separately sends, to a first transmit site and a second transmit site,  │
│  configuration information 1 corresponding to a DsRS 1, and separately sends, to the      │──300
│  first transmit site and the second transmit site, configuration information 2            │
│  corresponding to a DsRS 2; and correspondingly, the second transmit site sends first     │
│  configuration information to first UE according to the configuration information 1, and  │
│  sends second configuration information to second UE according to the configuration       │
│                                   information 2                                            │
└─────────────────────────────────────────────────────────────────────┘
                                      │
                                      ▼
┌─────────────────────────────────────────────────────────────────────┐
│  The first transmit site sends the DsRS 1 to the first UE according to the configuration  │
│  information 1 and by using a first transmit power and a first transmit period; and the   │
│  first transmit site sends the DsRS 2 to the second UE according to the configuration     │──301'
│  information 2 and by using a second transmit power and a second transmit period, so      │
│  that the first UE acquires a first signal measurement result of the first UE according to│
│  the first configuration information and the DsRS 1 that are received, and the second UE  │
│  acquires a second signal measurement result of the second UE according to the second     │
│                   configuration information and the DsRS 2 that are received              │
└─────────────────────────────────────────────────────────────────────┘
                                      │
                                      ▼
┌─────────────────────────────────────────────────────────────────────┐
│  The control device receives, from the second transmit site, the first signal measurement │
│  result of the first UE for the DsRS 1, and the second signal measurement result of the   │──3021c
│  second UE for the DsRS 2, where the second transmit site directly receives the first     │
│  signal measurement result of the first UE for the DsRS 1, and directly receives the      │
│              second signal measurement result of the second UE for the DsRS 2             │
└─────────────────────────────────────────────────────────────────────┘
                                      │
                                      ▼
┌─────────────────────────────────────────────────────────────────────┐
│  The control device determines, according to the first signal measurement result and the  │──303
│  second signal measurement result, whether to switch an operation mode of the first       │
│                                    transmit site                                           │
└─────────────────────────────────────────────────────────────────────┘
```

FIG. 3F

A second transmit site sends configuration information 1 and configuration information 2 to a first transmit site, so that the first transmit site sends a DsRS 1 to first UE according to the configuration information 1 and by using a first transmit power and a first transmit period, where the DsRS 1 is used by the first UE for signal quality measurement; the first transmit site sends a DsRS 2 to second UE according to the configuration information 2 and by using a second transmit power and a second transmit period, where the DsRS 2 is used by the second UE for signal quality measurement ⎯ S300

The second transmit site separately sends corresponding configuration information to the first UE and the second UE, for example, the second transmit site sends first configuration information to the first UE, and sends second configuration information to the second UE, so that the first UE acquires a first signal measurement result according to the first configuration information and the DsRS 1, and the second UE acquires a second signal measurement result according to the second configuration information and the DsRS 2 ⎯ S301

The second transmit site receives the first signal measurement result of the first UE for the first discovery reference signal, and receives the second signal measurement result of the second UE for the second discovery reference signal ⎯ S302

The second transmit site determines, according to the first signal measurement result and the second signal measurement result, whether to switch an operation mode of the first transmit site ⎯ S303

FIG. 3G

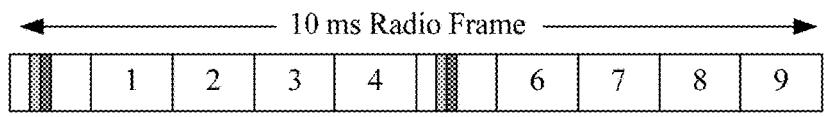

FIG. 4A

FIG. 4B

SIGNAL SENDING METHOD AND DEVICE

CROSS-REFERENCE TO RELATED APPLICATIONS

This application is a continuation of International Application PCT/CN2014/074458, filed Mar. 31, 2014, which claims priority to Chinese Patent Application No. 201310110033.7, filed Mar. 29, 2013, both of which are hereby incorporated by reference in their entireties.

TECHNICAL FIELD

Embodiments of the present invention relate to the communications field, and in particular, to a signal sending method and device.

BACKGROUND

At present, performance of a single cell system based on a multiple input multiple output (MIMO) technology is close to a theoretical communication limit, and it is extremely difficult to further improve the performance. If a communications technology based on coordinated multipoint (CoMP) needs to reach theoretical performance, it has a high requirement on interconnectivity of physical network devices, for example, high-speed interconnection fibers are needed between different base stations, and this imposes a high requirement on base station distribution and network distribution in an urban area; in addition, the CoMP technology also imposes a high requirement on synchronization between base stations, and poor timing and frequency synchronization performance between different base stations significantly affects a gain that can be actually obtained.

Therefore, attention is paid to concepts of small cells and dense small cells. The idea of a small cell is to deploy small base stations with relatively small coverage, that is, small cells (Pico), in a geographical region that has a relatively large amount of transmission data, so as to improve a data transmission amount per unit area, thereby resolving a conflict between an insufficient transmission rate of a macro base station and an excessive data demand in some hotspot regions.

During small cell deployment, the issue of small cell discovery needs to be resolved. That is, small cell sites in an area in which small cells are deployed are not always in an on state. For example, the whole area of the Zhongguancun shopping street is covered by a macro base station, and small cell sites need to be turned on only when a data transmission capability in some areas is insufficient after business is started in the morning. In other cases, for example, in off-work hours at night or when there are not many user equipments (User Equipment, UE for short) in the daytime, the small cell sites do not need to be turned on. In an ideal state, some small cells are turned off when there are not many UEs, which not only can reduce unnecessary energy consumption and reduce operation costs of an operator, but also can reduce unnecessary radiation and interference.

However, because a small cell site can be turned off, how to activate a small cell site in an off state, that is, a sleep state, to enter a communication state is an urgent technical problem to be resolved.

In view of the current problem of how to activate a small cell site in a sleep state to enter a communication state, the prior art provides an implementation manner, which is specifically as follows:

A macro base station is used to control when to turn on and turn off a small cell. For example, a macro base station connected to small cell sites may turn on small cell sites nearby when the macro base station finds that there are a relatively large quantity of UEs in a coverage area of the macro base station and a requirement cannot be met, so that the small cell sites can bear some UEs that cannot be borne by the macro base station The foregoing implementation manner has the following problems: In one aspect, not all areas in which the small cell sites are located are covered by a macro base station, and even if an area in which a small cell site is located is covered by a macro base station, the macro base station is not necessarily a macro base station in a same system as the small cell sites. For example, a Pico (that is, a small cell site) is in a Long Term Evolution (Long Term Evolution, LTE for short) system, and a macro base station is in a global system for mobile communications (GSM), and in this case, the macro base station in the GSM cannot control the Pico in the LTE system. Such a scenario will exist for a long period of time after LTE starts operation. In another aspect, even if there are both a macro base station and a Pico in an LTE system, and the macro base station knows how many UEs are covered by the macro base station, the macro base station may not know distribution locations of these UEs precisely or a precise location of the Pico, and in this case, even if the Pico is turned on, not many UEs can be offloaded to the Pico.

SUMMARY

In view of this, embodiments of the present invention provide a signal sending method and device, so as to resolve a problem in the prior art that users cannot be offloaded effectively and a throughput of a hotspot area cannot be improved because on/off of a small cell cannot be controlled effectively.

According to a first aspect, an embodiment of the present invention provides a signal sending method, including:

sending a first discovery reference signal DsRS 1 to first user equipment UE by using a first transmit power and a first transmit period, where the first discovery reference signal is used by the first UE for signal quality measurement;

sending a second discovery reference signal DsRS 2 to second user equipment UE by using a second transmit power and a second transmit period, where the second discovery reference signal is used by the second UE for signal quality measurement; and receiving a first signal measurement result of the first UE for the first discovery reference signal, and receiving a second signal measurement result of the second UE for the second discovery reference signal.

With reference to the first aspect, in a first possible implementation manner, the receiving a first signal measurement result of the first UE for the first discovery reference signal, and receiving a second signal measurement result of the second UE for the second discovery reference signal includes:

receiving, by a first transmit site, the first signal measurement result of the first UE for the first discovery reference signal, receiving the second signal measurement result of the second UE for the second discovery reference signal, and determining, according to the first signal measurement result and the second signal measurement result, whether to switch an operation mode, where the first transmit site is a site that sends the DsRS 1 and the DsRS 2.

With reference to the first aspect or the first possible implementation manner, in a second possible implementation manner, before the receiving a first signal measurement result of the first UE for the first discovery reference signal, and receiving a second signal measurement result of the second UE for the second discovery reference signal, the method further includes:

sending, by the first transmit site to a second transmit site, configuration information 1 corresponding to the DsRS 1, and configuration information 2 corresponding to the DsRS 2; and correspondingly, sending, by the second transmit site, first configuration information to the first UE according to the configuration information 1, and sending second configuration information to the second UE according to the configuration information 2, so that the first UE acquires the first signal measurement result of the first UE according to the first configuration information and the DsRS 1, and the second UE acquires the second signal measurement result of the second UE according to the second configuration information and the DsRS 2, where the first transmit site is the site that sends the DsRS 1 and the DsRS 2.

With reference to the second possible implementation manner, in a third possible implementation manner, the receiving, by a first transmit site, the first signal measurement result of the first UE for the first discovery reference signal, and receiving the second signal measurement result of the second UE for the second discovery reference signal includes:

receiving, by the first transmit site, the first signal measurement result of the first UE and the second signal measurement result of the second UE that are sent by the second transmit site, where the second transmit site is a site that directly receives the first signal measurement result acquired by the first UE and receives the second signal measurement result acquired by the second UE.

With reference to the first aspect, in a fourth possible implementation manner, the receiving a first signal measurement result of the first UE for the first discovery reference signal, and receiving a second signal measurement result of the second UE for the second discovery reference signal includes:

receiving, by a control device from a second transmit site, the first signal measurement result of the first UE for the first discovery reference signal, and the second signal measurement result of the second UE for the second discovery reference signal; and determining, by the control device according to the first signal measurement result and the second signal measurement result, whether to switch an operation mode of a first transmit site, where the first transmit site is a site that sends the DsRS 1 and the DsRS 2, and the second transmit site is a site that directly receives the first signal measurement result acquired by the first UE, and receives the second signal measurement result acquired by the second UE.

With reference the fourth possible implementation manner, in a fifth possible implementation manner, before sending a DsRS 1 to a first UE by using a first transmit power and a first transmit period, the method further includes:

separately sending, by the control device to the first transmit site and the second transmit site, configuration information 1 corresponding to the DsRS 1, and separately sending, to the first transmit site and the second transmit site, configuration information 2 corresponding to the DsRS 2; and correspondingly, sending, by the second transmit site, first configuration information to the first UE according to the configuration information 1, and sending second configuration information to the second UE according to the configuration information 2, so that the first UE acquires the first signal measurement result according to the first configuration information and the DsRS 1, and the second UE acquires the second signal measurement result according to the second configuration information and the DsRS 2;

the sending a DsRS 1 to first UE by using a first transmit power and a first transmit period includes:

sending, by the first transmit site according to the configuration information 1, the DsRS 1 to the first UE by using the first transmit power and the first transmit period; and the sending a DsRS 2 to second UE by using a second transmit power and a second transmit period includes:

sending, by the first transmit site according to the configuration information 2, the DsRS 2 to the second UE by using the second transmit power and the second transmit period.

With reference to the first aspect, in a sixth possible implementation manner, the receiving a first signal measurement result of the first UE for the first discovery reference signal, and receiving a second signal measurement result of the second UE for the second discovery reference signal includes:

receiving, by a second transmit site, the first signal measurement result of the first UE for the first discovery reference signal, and receiving the second signal measurement result of the second UE for the second discovery reference signal; and determining, by the second transmit site according to the first signal measurement result and the second signal measurement result, whether to switch an operation mode of a first transmit site, where the first transmit site is a site that sends the DsRS 1 and the DsRS 2.

With reference to the first aspect and the foregoing possible implementation manners, in a seventh possible implementation manner, the DsRS 1 includes one or more of the following:

a primary synchronization signal PSS, a secondary synchronization signal SSS, and a cell-specific reference signal CRS, and the DsRS 2 includes one or more of the following:
a PSS, an SSS, and a CRS;
or,
the DsRS 1 includes one or more of the following:
a primary synchronization signal PSS, a secondary synchronization signal SSS, and a channel state information-reference signal CSI-RS, and
the DsRS 2 includes one or more of the following:
a PSS, an SSS, and a CSI-RS.

With reference to the first aspect and the foregoing possible implementation manners, in an eighth possible implementation manner, if the first UE is earlier-version UE, and the second UE is new-version UE, the first transmit period is less than or equal to the second transmit period, and/or the first transmit power is less than or equal to the second transmit power.

With reference the eighth possible implementation manner, in a ninth possible implementation manner, the first transmit period is 5 ms or 10 ms; and the second transmit period is 100 ms, 200 ms, 400 ms, 800 ms, or 1000 ms.

With reference to the first aspect and the foregoing possible implementation manners, in a tenth possible implementation manner, the first signal measurement result of
the first UE includes one or more of the following:
an identifier of the first UE;
a measurement value of a reference signal received power RSRP acquired by the first UE corresponding to the identifier of the first UE;
a measurement value of reference signal received quality RSRQ acquired by the first UE corresponding to the identifier of the first UE; and
a measurement value of a received signal strength indicator RSSI acquired by the first UE corresponding to the identifier of the first UE; and
the second signal measurement result of the second UE includes one or more of the following:
an identifier of the second UE;
a measurement value of an RSRP acquired by the second UE corresponding to the identifier of the second UE;
a measurement value of RSRQ acquired by the second UE corresponding to the identifier of the second UE; and a measurement value of an RSSI acquired by the second UE corresponding to the identifier of the second UE.

According to a second aspect, an embodiment of the present invention provides a signal sending device, including:
a sending unit, configured to send a first discovery reference signal DsRS 1 to first user equipment UE by using a first transmit power and a first transmit period, where the first discovery reference signal is used by the first UE for signal quality measurement; and send a second discovery reference signal DsRS 2 to second user equipment UE by using a second transmit power and a second transmit period, where the second discovery reference signal is used by the second UE for signal quality measurement; and
a receiving unit, configured to receive a first signal measurement result of the first UE for the first discovery reference signal, receive a second signal measurement result of the second UE for the second discovery reference signal, and determine, according to the first signal measurement result and the second signal measurement result, whether to switch an operation mode.

With reference to the second aspect, in a first possible implementation manner, the sending unit is further configured to:
send, to a second transmit site, configuration information 1 corresponding to the DsRS 1 and configuration information 2 corresponding to the DsRS 2, so that the second transmit site sends first configuration information to the first UE according to the configuration information 1, and sends second configuration information to the second UE according to the configuration information 2, and further, the first UE acquires the first signal measurement result according to the first configuration information and the DsRS 1, and the second UE acquires the second signal measurement result according to the second configuration information and the DsRS 2.

With reference to the first possible implementation manner, in a second possible implementation manner, the receiving unit is specifically configured to receive the first signal measurement result of the first UE and the second signal measurement result of the second UE that are sent by a second transmit site, where
the second transmit site is a site that directly receives the first signal measurement result acquired by the first UE and receives the second signal measurement result acquired by the second UE.

With reference to the second aspect and the foregoing possible implementation manners, in a third possible implementation manner, the DsRS 1 includes one or more of the following:
a primary synchronization signal PSS, a secondary synchronization signal SSS, and a cell-specific reference signal CRS, and
the DsRS 2 includes one or more of the following:
a PSS, an SSS, and a CRS;
or,
the DsRS 1 includes one or more of the following:
a primary synchronization signal PSS, a secondary synchronization signal SSS, and a channel state information-reference signal CSI-RS, and
the DsRS 2 includes one or more of the following:
a PSS, an SSS, and a CSI-RS.

With reference to the second aspect and the foregoing possible implementation manners, in a fourth possible implementation manner, if the first UE is earlier-version UE, and the second UE is new-version UE,
the first transmit period is less than or equal to the second transmit period,
and/or
the first transmit power is less than or equal to the second transmit power.

With reference to the fourth possible implementation manner, in a fifth possible implementation manner, the first transmit period is 5 ms or 10 ms; and the second transmit period is 100 ms, 200 ms, 400 ms, 800 ms, or 1000 ms.

With reference to the second aspect and the foregoing possible implementation manners, in a sixth possible implementation manner, the first signal measurement result of the first UE includes one or more of the following:
an identifier of the first UE;
a measurement value of a reference signal received power RSRP acquired by the first UE corresponding to the identifier of the first UE;
a measurement value of reference signal received quality RSRQ acquired by the first UE corresponding to the identifier of the first UE; and
a measurement value of a received signal strength indicator RSSI acquired by the first UE corresponding to the identifier of the first UE; and
the second signal measurement result of the second UE comprises one or more of the following:
an identifier of the second UE;
a measurement value of an RSRP acquired by the second UE corresponding to the identifier of the second UE;
a measurement value of RSRQ acquired by the second UE corresponding to the identifier of the second UE; and
a measurement value of an RSSI acquired by the second UE corresponding to the identifier of the second UE.

According to a third aspect, an embodiment of the present invention provides a communications system, including a first transmit site, a second transmit site, and a control device, where
the first transmit site sends a first discovery reference signal DsRS 1 to first user equipment UE by using a first transmit power and a first transmit period, where the first discovery reference signal is used by the first UE for signal quality measurement; and sends a second discovery reference signal DsRS 2 to second user equipment UE by using a second transmit power and a second transmit period, where the second discovery reference signal is used by the second UE for signal quality measurement;
the control device receives, from the second transmit site, a first signal measurement result of the first UE for the first discovery reference signal, and a second signal measurement result of the second UE for the second discovery reference signal; and the control device determines, according to the first signal measurement result and the second signal measurement result, whether to switch an operation mode of the first transmit site, where the second transmit site is a site that directly receives the first signal measurement result acquired by the first UE and receives the second signal measurement result acquired by the second UE.

With reference to the third aspect, in a first possible implementation manner, the control device is further configured to:

before the first transmit site sends the DsRS 1 to the first UE by using the first transmit power and the first transmit period, separately send, to the first transmit site and the second transmit site, configuration information 1 corresponding to the DsRS 1, and separately send, to the first transmit site and the second transmit site, configuration information 2 corresponding to the DsRS 2; and the second transmit site is further configured to send first configuration information to the first UE according to the configuration information 1, and send second configuration information to the second UE according to the configuration information 2, so that the first UE acquires the first signal measurement result according to the first configuration information and the DsRS 1, and the second UE acquires the second signal measurement result according to the second configuration information and the DsRS 2, where correspondingly, that the first transmit site sends the DsRS 1 to the first UE by using the first transmit power and the first transmit period includes:

sending, by the first transmit site according to the configuration information 1, the DsRS 1 to the first UE by using the first transmit power and the first transmit period; and that the first transmit site sends the DsRS 2 to the second UE by using the second transmit power and the second transmit period includes:

sending, by the first transmit site according to the configuration information 2, the DsRS 2 to the second UE by using the second transmit power and the second transmit period.

With reference to the third aspect and the foregoing possible implementation manner, in a second possible implementation manner, the DsRS 1 includes one or more of the following:

a primary synchronization signal PSS, a secondary synchronization signal SSS, and a cell-specific reference signal CRS, and the DsRS 2 includes one or more of the following:

a PSS, an SSS, and a CRS;

or, the DsRS 1 includes one or more of the following:

a primary synchronization signal PSS, a secondary synchronization signal SSS, and a channel state information-reference signal CSI-RS, and the DsRS 2 includes one or more of the following:

a PSS, an SSS, and a CSI-RS.

With reference to the third aspect and the foregoing possible implementation manners, in a third possible implementation manner, if the first UE is earlier-version UE, and the second UE is new-version UE, the first transmit period is less than or equal to the second transmit period, and/or the first transmit power is less than or equal to the second transmit power.

With reference to the third aspect and the third possible implementation manner, in a fourth possible implementation manner, the first transmit period is 5 ms or 10 ms; and the second transmit period is 100 ms, 200 ms, 400 ms, 800 ms, or 1000 ms.

With reference to the third aspect and the foregoing possible implementation manners, in a fifth possible implementation manner, the first signal measurement result of the first UE includes one or more of the following:

an identifier of the first UE;

a measurement value of a reference signal received power RSRP acquired by the first UE corresponding to the identifier of the first UE;

a measurement value of reference signal received quality RSRQ acquired by the first UE corresponding to the identifier of the first UE; and a measurement value of a received signal strength indicator RSSI acquired by the first UE corresponding to the identifier of the first UE; and the second signal measurement result of the second UE comprises one or more of the following:

an identifier of the second UE;

a measurement value of an RSRP acquired by the second UE corresponding to the identifier of the second UE;

a measurement value of RSRQ acquired by the second UE corresponding to the identifier of the second UE; and a measurement value of an RSSI acquired by the second UE corresponding to the identifier of the second UE.

It can be known from the foregoing technical solutions that, according to the signal sending method and device in the embodiments of the present invention, a first discovery reference signal is sent to first UE, such as earlier-version UE, by using a first transmit power and a first transmit period, and a second discovery reference signal is sent to second UE, such as new-version UE, by using a second transmit power and a second transmit period, so that both the earlier-version UE and the new-version UE can receive the signals for performing signal quality measurement; and a first signal measurement result of the first UE is received and a second signal measurement result of the second UE is received, so that when on/off control of a small cell in the prior art is implemented according to the first signal measurement result and the second signal measurement result, a problem in the prior art can be resolved effectively, where the problem is that users cannot be offloaded to the small cell effectively and a throughput of a hotspot area including a relatively large quantity of first UEs and/or second UEs cannot be improved because on/off of the small cell cannot be controlled effectively.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 3A is a schematic flowchart of a signal sending method according to an embodiment of the present invention;

FIG. 3B is a schematic diagram of distribution of multiple pico base stations according to an embodiment of the present invention;

FIG. 3C to FIG. 3G are a schematic flowchart of a signal sending method according to another embodiment of the present invention;

FIG. 4A is a schematic diagram of a subframe according to an embodiment of the present invention;

FIG. 4B is a schematic diagram of a period of a discovery reference signal according to an embodiment of the present invention;

DESCRIPTION OF EMBODIMENTS

To make the objectives, technical solutions, and advantages of the present invention clearer, the following clearly describes the technical solutions of the present invention with reference to the accompanying drawings in the embodiments of the present invention. Apparently, the following described embodiments are some of the embodiments of the present invention. Based on the embodiments of the present invention, a person of ordinary skill in the art can obtain other embodiments that can solve the technical problem of the present invention and implement the technical effect of the present invention by equivalently altering some or all the technical features even without creative efforts. Apparently, the embodiments obtained by means of alteration do not depart from the scope disclosed in the present invention.

In the specific description of the embodiments of the present invention, for ease of understanding a signal sending method in the embodiments of the present invention, first of all, a schematic diagram of current distribution of a macro base station and a pico base station and an association between the pico base station and the macro base station are separately described with reference to FIG. 1, FIG. 2, and FIG. 3.

Figure 1:
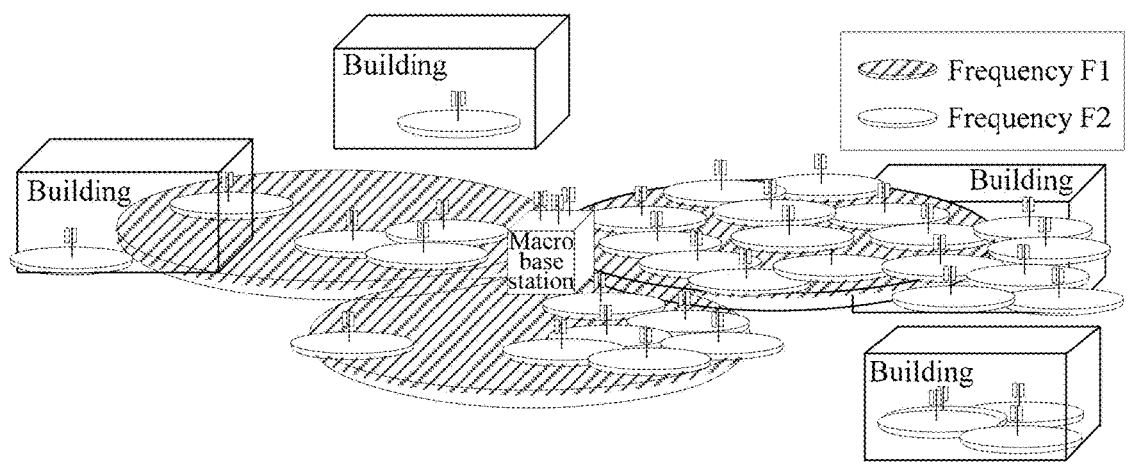
FIG. 1 is a schematic diagram of distribution of a macro base station and a pico base station in the prior art.

FIG. 1 shows a dense deployment scenario and a sparse deployment scenario of pico base stations, where F1 in FIG. 1 represents a frequency used by the macro base station, F2 represents a frequency used by the pico base stations, and F1 and F2 may be the same or may be different. It can be seen from FIG. 1 that, in an actual application, part of a coverage area of the macro base station overlaps coverage areas of the pico base stations, and part of the coverage area of the macro base station does not overlap the coverage areas of the pico base stations.

In the following, description is made by using an example in which coverage areas of neighboring sites partially overlap or completely overlap. The neighboring sites may be a macro base station and a pico base station, or the neighboring sites may be a pico base station and a pico base station.

Figure 2:
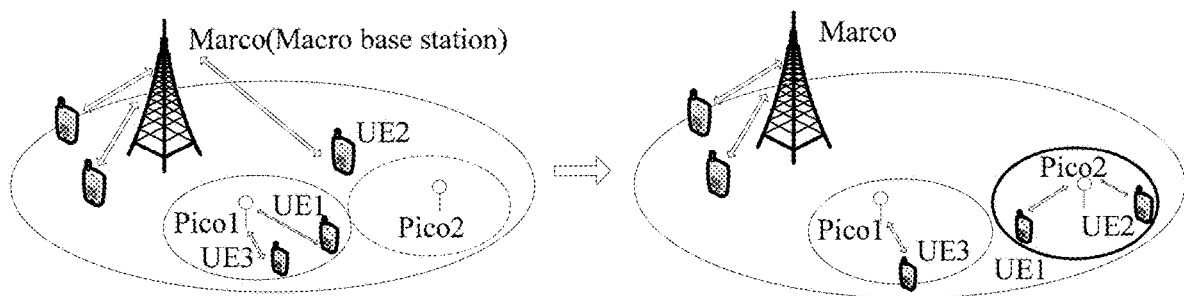
FIG. 2 is a schematic structural diagram of a pico base station being woken up in the prior art.

As shown in FIG. 2, Pico2 in the left figure is in a sleep mode, and Pico2 needs to be woken up by using a small cell wake-up mechanism; and as shown in the right figure of FIG. 2, after Pico2 is woken up, a Macro base station, Pico1, and Pico2 can all provide a communications service for UE1 and UE2.

A problem to be resolved in the embodiments of the present invention is how to wake up sleep Pico2 from a sleep mode or activate sleep Pico2 to enter an operation state while fully utilizing information of earlier-version UE and new-version UE in a network during a wake-up or activation process, so that users of various versions can be offloaded from a neighboring cell as many as possible, thereby improving a throughput of the while network, that is, resolving a problem of effective turn-on of small cells in the prior art.

In the embodiments of the present invention, the earlier-version UE includes UE of Rel-11 and earlier versions (including Rel-10, Rel-9, and Rel-8) in an LTE system, and the new-version UE is UE of versions later than LTE Rel-11, for example, UE of Rel-12 version.

FIG. 3A shows a schematic flowchart of a signal sending method according to an embodiment of the present invention. As shown in FIG. 3A, the signal sending method in this embodiment is described as follows:

301: Send a first discovery reference signal (Discovery Reference Signal 1, DsRS 1 for short) to first UE by using a first transmit power and a first transmit period, where the first discovery reference signal is used by the first UE for signal quality measurement; and send a second discovery reference signal DsRS 2 to second UE by using a second transmit power and a second transmit period, where the second discovery reference signal is used by the second UE for signal quality measurement.

302: Receive a first signal measurement result of the first UE for the first discovery reference signal, and receive a second signal measurement result of the second UE for the second discovery reference signal.

Generally, the first signal measurement result and the second signal measurement result may be used to implement operation mode switching control of a small cell mentioned in the prior art. The small cell may be a small cell in a sleep operation mode.

For example, the first signal measurement result of the first UE includes one or more of the following:

an identifier of the first UE, a measurement value of a reference signal received power (RSRP) acquired by the first UE corresponding to the identifier of the first UE, a measurement value of reference signal received quality (RSRQ) acquired by the first UE corresponding to the identifier of the first UE, and a measurement value of a received signal strength indicator (RSSI) acquired by the first UE corresponding to the identifier of the first UE.

The second signal measurement result of the second UE includes one or more of the following:

an identifier of the second UE, a measurement value of an RSRP acquired by the second UE corresponding to the identifier of the second UE, a measurement value of RSRQ acquired by the second UE corresponding to the identifier of the second UE, and a measurement value of an RSSI acquired by the second UE corresponding to the identifier of the second UE.

It can be known from the foregoing embodiment that, according to the signal sending method in this embodiment, a first discovery reference signal is sent to first UE, such as earlier-version UE, by using a first transmit power and a first transmit period, and a second discovery reference signal is sent to second UE, such as new-version UE, by using a second transmit power and a second transmit period, so that both the earlier-version UE and the new-version UE can receive the signals for performing signal quality measurement; and a first signal measurement result of the first UE is received and a second signal measurement result of the second UE is received, so that when on/off control of a small cell in the prior art is implemented according to the first signal measurement result and the second signal measurement result, a problem in the prior art can be resolved effectively, where the problem is that users cannot be offloaded effectively and a throughput of a hotspot area cannot be improved because on/off of the small cell cannot be controlled effectively. The hotspot area herein may be an area in which a relatively large quantity of first UEs and/or second UEs is distributed.

Optionally, in a first possible implementation scenario, step 302 may include sub-step 3021 that is not shown in the figure:

3021: A first transmit site receives the first signal measurement result of the first UE for the first discovery reference signal, receives the second signal measurement result of the second UE for the second discovery reference signal, and determines, according to the first signal measurement result and the second signal measurement result, whether to switch an operation mode.

The first transmit site is a site that sends the DsRS 1 and DsRS 2, such as a sleep small cell site, or a sleep Pico.

That is, in a specific application, the first transmit site may determine, according to the received first signal measurement result of the first UE and second signal measurement result of the second UE, whether to switch the operation mode, that is, whether to switch an operation state. For example, when received first signal measurement results of first UEs and second signal measurement results of second UEs are greater than or equal to a preset threshold or when the first UEs and second UEs are separately at particular signal levels, the operation mode of the first transmit site may be switched.

If the first transmit site does not switch to an operation mode, that is, the first transmit site is still in a sleep mode, the foregoing steps in FIG. 3A are repeated. If the operation mode is switched, the first transmit site switches itself to a normal operation mode completely. In this case, the first transmit site may start to send, through a downlink control channel, various public control information and public physical signals to UE in a service area of the first transmit site, and start to provide a service for UE accessing the first transmit site.

With reference to FIG. 3B, Pico1, Pico2, and Pico3 are three Picos, that is, small cells, in an operation state, and Pico4 is a Pico in a sleep state, that is, a sleep small cell. The small cells in the operation state communicate normally with UE served by the small cells; UE in a coverage area of Pico4 may receive a discovery reference signal sent by Pico4 that is in the sleep state, where the discovery reference signal is used by the UE for signal quality measurement, so that Pico4 in the sleep mode may determine, according to a signal measurement result of the UE, whether to switch an operation mode.

In a specific application, Pico4 may send the first discovery reference signal to the first UE, such as earlier-version UE, by using the first transmit power and the first transmit period, send the second discovery reference signal to the second UE, such as new-version UE, by using the second transmit power and the second transmit period, and receive the first signal measurement result of the first UE and the second signal measurement result of the second UE.

It should be noted that, the Picos in FIG. 3B are connected to each other by using interfaces between sites, and these interfaces may be standard X2 interfaces defined in the LTE protocol or other interfaces.

In another embodiment, FIG. 3B may further include one or more macro base stations, and this embodiment is merely an example for description, and does not limit other application manners.

The foregoing first transmit site sends, to earlier-version UE and new-version UE by using different transmit powers and different transmit periods, discovery reference signals that can be separately recognized by the earlier-version UE and new-version UE, thereby resolving a problem of backward compatibility that exists during an operation mode switching process of a sleep small cell covering earlier-version UE and new-version UE in the prior art.

Optionally, in a second possible implementation scenario, step 302 may include sub-step 3021' that is not shown in the figure:

3021': A first transmit site receives the first signal measurement result of the first UE and the second signal measurement result of the second UE that are sent by a second transmit site.

The second transmit site is a site that directly receives the first signal measurement result acquired by the first UE and receives the second signal measurement result acquired by the second UE.

With reference to FIG. 3B, the first transmit site is Pico4, and the second transmit site may be one or more of Pico1, Pico2, and Pico3.

Certainly, it should be noted that, a signal between a transmit site, such as a Pico, and UE (including earlier-version UE and new-version UE) is transmitted by using an air interface protocol, and a signal/information between transmit sites is mainly transmitted by using an interface between the transmit sites. The interface herein may be an X2 interface in the LTE protocol, including a transmission line for connection, a microwave, a particularly defined transmission interface between sites, and the like.

In the foregoing signal sending method, a first transmit site sends, to earlier-version UE and new-version UE by using different transmit powers and different transmit periods, discovery reference signals that can be separately recognized by the earlier-version UE and new-version UE, and the first transmit site acquires, by using a second transmit site, signal measurement results (such as a first signal measurement result and a second signal measurement result) needed by the first transmit site, so that when on/off control of a small cell in the prior art is implemented according to the first signal measurement result and the second signal measurement result, a problem in the prior art is resolved effectively, where the problem is that users cannot be offloaded to the small cell effectively and a throughput of a hotspot area including a relatively large quantity of first UEs and/or second UEs cannot be improved because the on/off of the small cell cannot be controlled effectively.

Optionally, in a third possible implementation scenario, before step 302 in the signal sending method, the signal sending method may further include step 302a that is not shown in the figure:

302a: A first transmit site sends, to a second transmit site, configuration information 1 corresponding to the DsRS 1 and configuration information 2 corresponding to the DsRS 2; and correspondingly, the second transmit site sends first configuration information to the first UE according to the configuration information 1, and sends second configuration information to the second UE according to the configuration information 2, so that the first UE acquires the first signal measurement result of the first UE according to the first configuration information and the DsRS 1, and the second UE acquires the second signal measurement result of the second UE according to the second configuration information and the DsRS 2.

The first transmit site is a site that sends the DsRS 1 and the DsRS 2, the second transmit site is a site whose coverage area overlaps that of the first transmit site, and the second transmit site and the first transmit site are connected to each other by using an interface between the sites.

In a specific application, the configuration information 1 and configuration information 2 sent by the first transmit site to the second transmit site may be transmitted by using an interconnection line between the first transmit site and the second transmit site.

It should be understood that, the first transmit site may set the first configuration information and the second configuration information based on cell identity information of the first transmit site and energy received in the uplink by the first transmit site.

In addition, it should be noted that, when UE accesses the second transmit site, the UE needs to report, to the second transmit site, information about a capability of the UE and a feature supported by the UE. The information can correspond to different UE versions.

In another embodiment, the second transmit site may further send the first configuration information to the first UE and send the second configuration information to the second UE according to the configuration information 1 and the configuration information 2, and this embodiment is merely an example for description.

Correspondingly, step 302 in the signal sending method shown in FIG. 3A may be specifically:

3021a: the first transmit site receives the first signal measurement result of the first UE for the first discovery reference signal, receives the second signal measurement result of the second UE for the second discovery reference signal, and determines, according to the first signal measurement result and the second signal measurement result, whether to switch an operation mode;

or,

3021b: the first transmit site receives the first signal measurement result of the first UE and the second signal measurement result of the second UE that are sent by the second transmit site, where the second transmit site is a site that directly receives the first signal measurement result acquired by the first UE and directly receives the second signal measurement result acquired by the second UE.

In the foregoing optional implementation scenario, the first UE acquires the first signal measurement result according to the received DsRS 1 and the first configuration information corresponding to the DsRS 1, and the second UE acquires the second signal measurement result according to the received DsRS 2 and the second configuration information corresponding to the DsRS 2.

In an implementation manner, the first UE and the second UE may directly send the signal measurement results thereof (such as the first signal measurement result of the first UE, and the second signal measurement result of the second UE) to the first transmit site, as shown in FIG. 3C. In another implementation manner, the first UE and the second UE may directly send the signal measurement results thereof to the second transmit site, and the second transmit site sends, to the first transmit site by using an interface between the sites, a measurement report that is generated according to signal measurement results corresponding to all first UEs and second UEs (for example, the first signal measurement result of the first UE, and the second signal measurement result of the second UE), as shown in FIG. 3D.

The measurement report transmitted between the sites herein may be generated in multiple manners, for example, manners listed in the following.

Manner 1: direct generating method: measurement reports that are sent by all first UEs and all second UEs to the second transmit site and corresponding UE identifiers are directly sent to the second transmit site. That is, a basic manner of information composition is (identifier of UE, measurement report reported by the UE). An advantage of this manner is that a measurement report includes all measurement information, and the information is the most complete, and a disadvantage is that a large amount of information data needs to be transmitted between the sites.

Manner 2: quantized indication method: for example, measurement reports of UE are classified into different quantization levels, and then measurement information of each UE follows the form of (identifier of UE, measurement quantization level value reported by the UE). An advantage of the manner 2 is that correspondences between UE identifiers and measurement reports are clear, and a relatively small amount of information data is transmitted. A disadvantage is that some information is lost in a quantization process due to an issue of quantization precision.

Manner 3: method of reporting quantities of UEs: for example, only quantities of UEs at different signal levels in a current cell are included; for example, RSRPs or RSRQ is classified into four levels, and then quantities of UEs at the four signal levels are indicated. This manner involves a smallest amount of transmitted information.

Certainly, in another embodiment, the second transmit site may directly report the received first signal measurement result of the first UE and second signal measurement result of the second UE to the first transmit site, for example, the second transmit site reports, to the first transmit site, received identifiers of UEs and information such as RSRPs, RSRQ, and RSSIs in measurement reports corresponding to the UEs.

In addition, with reference to FIG. 3B, the first transmit site is Pico4, and the second transmit site may be one or more of Pico1, Pico2, and Pico3.

The foregoing first transmit site sends, at the same time to earlier-version UE and new-version UE by using different transmit powers and different transmit periods, discovery reference signals that can be separately recognized by the earlier-version UE and new-version UE, and the first transmit site sends, by using a second transmit site, configuration information matching the discovery reference signals recognized by the UEs, so that the UEs acquire, according to the discovery reference signals that can be recognized and the corresponding configuration information, signal measurement results needed by the first transmit site, so that when on/off control of a small cell in the prior art is implemented according to a first signal measurement result and a second signal measurement result, a problem in the prior art can be resolved effectively, where the problem is that users cannot be offloaded to the small cell effectively and a throughput of a hotspot area including a relatively large quantity of first UEs and/or second UEs cannot be improved because on/off of the small cell cannot be controlled effectively.

Figure 3E:
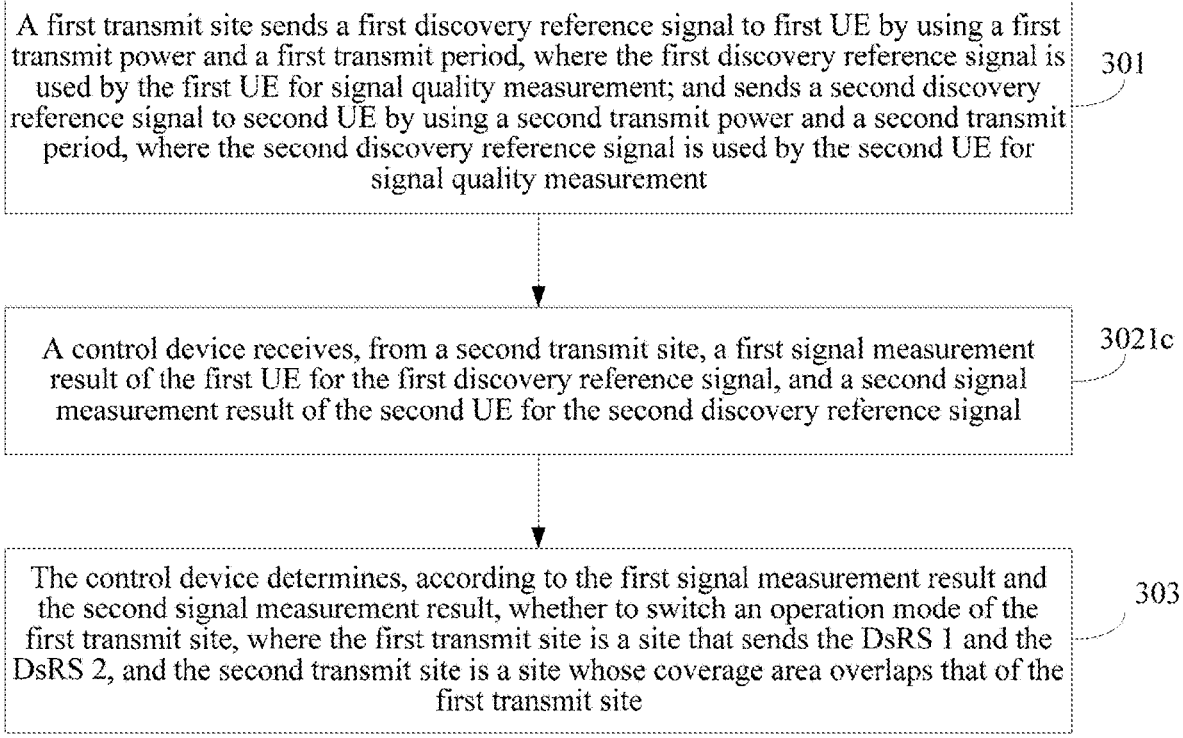

Optionally, in a fourth possible implementation scenario, step 302 in the signal sending method may specifically include the following sub-step 3021c, and the signal sending method includes the following step 303, as shown in FIG. 3E.

3021c: A control device receives, from a second transmit site, the first signal measurement result of the first UE for the first discovery reference signal, and the second signal measurement result of the second UE for the second discovery reference signal.

303: The control device determines, according to the first signal measurement result and the second signal measurement result, whether to switch an operation mode of the first transmit site, where the first transmit site is a site that sends the DsRS 1 and the DsRS 2, and the second transmit site is a site whose coverage area overlaps that of the first transmit site.

That is, in step 3021c, the second transmit site receives the first signal measurement result of the first UE and receives the second signal measurement result of the second UE, and sends the first signal measurement result of the first UE and the second signal measurement result of the second UE to the control device.

Alternatively, in another embodiment, the second transmit site receives the first signal measurement result of the first UE and receives the second signal measurement result of the second UE, and sends, to the control device by using an interface between the sites, a measurement report that is generated according to signal measurement results corresponding to all first UEs and second UEs.

It should be understood that, the control device is a device independent of the second transmit site, such as a macro base station or another control device.

The foregoing signal sending method can effectively resolve a problem in the prior art that users cannot be offloaded to a small cell effectively and a throughput of a hotspot area including a relatively large quantity of first UEs and/or second UEs cannot be improved because on/off of the small cell cannot be controlled effectively.

Optionally, in a fifth possible implementation scenario, the signal sending method may further include step 300 before step 301, and the signal sending method in this embodiment may include the following steps, as shown in FIG. 3F.

300: A control device separately sends, to a first transmit site and a second transmit site, configuration information 1 corresponding to a DsRS 1, and separately sends, to the first transmit site and the second transmit site, configuration information 2 corresponding to a DsRS 2; and correspondingly, the second transmit site sends first configuration information to the first UE according to the configuration information 1, and sends second configuration information to the second UE according to the configuration information 2.

The second transmit site is a site whose coverage area overlaps that of the first transmit site, and the control device, the second transmit site, and the first transmit site are all connected to each other by using interfaces between sites.

For example, the configuration information may include two parts: one part is information similar to mobility measurement information, and the other part is DsRS-related information. The two parts may be sent to UE as one message, or may be sent to UE as two different messages.

The mobility measurement information includes frequency channel number information of a cell to be measured, a cell ID of the cell to be measured, subframe locations of an RSRP and RSRQ to be measured, and other information.

The DsRS-related information includes a period of a discovery signal, an offset of the discovery signal, a resource indicator of the discovery signal, and other information.

301': The first transmit site sends the DsRS 1 to the first UE according to the configuration information 1 by using a first transmit power and a first transmit period; and the first transmit site sends the DsRS 2 to the second UE according to the configuration information 2 by using a second transmit power and a second transmit period, so that the first UE acquires a first signal measurement result of the first UE according to the first configuration information and the DsRS 1 that are received, and the second UE acquires a second signal measurement result of the second UE according to the second configuration information and the DsRS 2 that are received.

3021c: The control device receives, from the second transmit site, the first signal measurement result of the first UE for the DsRS 1, and the second signal measurement result of the second UE for the DsRS 2, where the second transmit site directly receives the first signal measurement result of the first UE for the DsRS 1, and directly receives the second signal measurement result of the second UE for the DsRS 2.

303: The control device determines, according to the first signal measurement result and the second signal measurement result, whether to switch an operation mode of the first transmit site.

The foregoing signal sending method can effectively resolve a problem in the prior art that users cannot be offloaded to a small cell effectively and a throughput of a hotspot area including a relatively large quantity of first UEs and/or second UEs cannot be improved because on/off of the small cell cannot be controlled effectively.

Optionally, in a sixth possible implementation scenario, if the control device in FIG. 3E and FIG. 3F is not an independent device, and the control device is a functional unit in the second transmit site, the signal sending method may include the following steps:

301: A first transmit site sends a DsRS 1 to first UE by using a first transmit power and a first transmit period, where the DsRS 1 is used by the first UE for signal quality measurement; and the first transmit site sends a DsRS 2 to second UE by using a second transmit power and a second transmit period, where the DsRS 2 is used by the second UE for signal quality measurement.

3021d: A second transmit site receives a first signal measurement result of the first UE for the first discovery reference signal, and receives a second signal measurement result of the second UE for the second discovery reference signal.

303': The second transmit site determines, according to the first signal measurement result and the second signal measurement result, whether to switch an operation mode of the first transmit site.

The first transmit site is a site that sends the DsRS 1 and the DsRS 2, the second transmit site is a site whose coverage area overlaps that of the first transmit site, and the second transmit site and the first transmit site are connected to each other by using an interface between the sites.

The foregoing signal sending method can effectively resolve a problem in the prior art that users cannot be offloaded to a small cell effectively and a throughput of a hotspot area including a relatively large quantity of first UEs and/or second UEs cannot be improved because on/off of the small cell cannot be controlled effectively.

Optionally, in a seventh possible implementation scenario, if the control device in FIG. 3E and FIG. 3F is not an independent device, and the control device is a functional unit in the second transmit site, the signal sending method may include the following steps, as shown in FIG. 3G:

S300: A second transmit site sends configuration information 1 and configuration information 2 to a first transmit site, so that the first transmit site sends a DsRS 1 to first UE according to the configuration information 1 by using a first transmit power and a first transmit period, where the DsRS 1 is used by the first UE for signal quality measurement; and the first transmit site sends a DsRS 2 to second UE according to the configuration information 2 by using a second transmit power and a second transmit period, where the DsRS 2 is used by the second UE for signal quality measurement.

S301: The second transmit site separately sends corresponding configuration information to the first UE and the second UE, for example, the second transmit site sends first configuration information to the first UE, and sends second configuration information to the second UE, so that the first UE acquires a first signal measurement result according to the first configuration information and the DsRS 1, and the second UE acquires a second signal measurement result according to the second configuration information and the DsRS 2.

S302: The second transmit site receives the first signal measurement result of the first UE for the first discovery reference signal, and receives the second signal measurement result of the second UE for the second discovery reference signal.

S303: The second transmit site determines, according to the first signal measurement result and the second signal measurement result, whether to switch an operation mode of the first transmit site.

The second transmit site is a site whose coverage area overlaps that of the first transmit site, and the second transmit site and the first transmit site are connected to each other by using an interface between the sites.

The foregoing signal sending method can effectively resolve a problem in the prior art that users cannot be offloaded to a small cell effectively and a throughput of a hotspot area including a relatively large quantity of first UEs and/or second UEs cannot be improved because on/off of the small cell cannot be controlled effectively.

In an actual application, the DsRS 1 may be a signal that can be recognized by earlier-version UE, and the DsRS 2 may be a signal that can be recognized by new-version UE. The earlier-version UE herein includes UE of Rel-11 and earlier versions (including Rel-10, Rel-9, and Rel-8) in an LTE system, and the new-version UE is UE of versions later than LTE Rel-11, for example, UE of Rel-12 version.

The first transmit power of the DsRS 1 and the second transmit power of the DsRS 2 may be the same or may be different. Generally, the first transmit power and the second transmit power are set to be different, for example, the first transmit power is less than or equal to the second transmit power.

The first transmit period of the DsRS 1 and the second transmit period of the DsRS 2 may be the same or may be different. Generally, the first transmit period is less than or equal to the second transmit period, for example, the first transmit period may be 5 ms or 10 ms; and the second transmit period may be 100 ms, 200 ms, 400 ms, 800 ms, or 1000 ms.

In a specific application scenario, the DsRS 1 in this embodiment includes one or more of the following: a primary synchronization signal (Primary Synchronization Signal, PSS for short), a secondary synchronization signal (Secondary Synchronization Signal, SSS for short), and a cell-specific reference signal (Cell-specific Reference Signal, CRS for short); and the DsRS 2 includes one or more of the following: a PSS, an SSS, and a CRS.

Specifically, in an actual application, the first transmit site periodically delivers a synchronization signal including a PSS and an SSS at intervals of a 5 ms period. That is, as shown in FIG. 4A, the first transmit site periodically sends the DsRS 1 including a PSS and an SSS by using the first transmit power, so that the earlier-version UE, that is, the first UE, may perform cell ID detection and perform time and frequency synchronization according to the PSS and SSS.

Optionally, the DsRS 1 may also include a synchronization signal (for example, a PSS and/or an SSS) using 5 ms as a period, and a CRS signal in a subframe (subframe 0 and subframe 5) in which the synchronization signal is located.

A bandwidth of the CRS signal in a frequency domain may be configured according to a manner specified in a protocol of the prior art, and therefore, the earlier-version UE may recognize the DsRS 1.

In addition, the DsRS 2 may include a synchronization signal (such as a PSS and/or an SSS) with a longer period; or, the DsRS 2 may include a synchronization signal with a longer period and a CRS signal in a subframe in which the synchronization signal is located, as shown in FIG. 4B.

Certainly, the period of the DsRS 2 is configurable, where the DsRS 2 with a long period may achieve effects of reducing a measurement time and a period of new-version UE, thereby reducing an amount of electricity consumed when the new-version UE performs DsRS 2 measurement, and further achieving an energy-saving purpose of the new-version UE.

In addition, a location at which the DsRS 2 appears in a 10 ms radio frame may be fixed, or may be configurable according to a protocol (that is, an offset of the location at which the DsRS 2 appears in 10 ms is configurable). It may be understood that, if the period of the DsRS 2 is 100 ms (which is equivalent to a length of 10 radio frames), a location at which the DsRS 2 appears in the 10 radio frames whose length is 100 ms, that is, in which subframe (1 ms period) of which radio frame (10 ms period) the DsRS 2 appears, is configurable.

If the DsRS 2 includes a synchronization signal (a PSS and/or an SSS), a location at which the synchronization signal appears in subframes is also configurable.

Figure 4C:
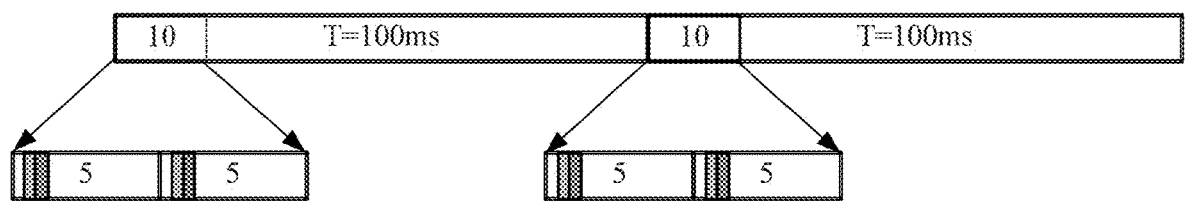
FIG. 4C is a schematic diagram of a time-domain location of a discovery reference signal according to an embodiment of the present invention.

As shown in FIG. 4C, in every 100 ms of subframes, that is, in a DsRS 2 period signal, the DsRS 2 appears in a $0^{th}$ 5 ms subframe in a 10 ms frame.

Figure 4D:
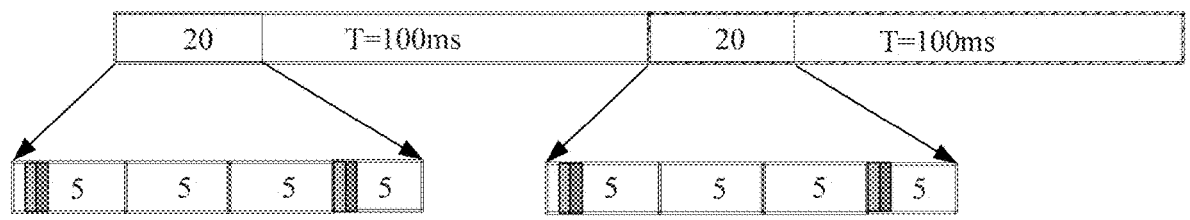
FIG. 4D is a schematic diagram of a time-domain location of a discovery reference signal according to an embodiment of the present invention.

As shown in FIG. 4D, in every 100 ms of subframes, that is, in a DsRS 2 period signal, the DsRS 2 appears in the first and last 5 ms subframes in 20 ms.

In a specific application scenario, the DsRS 1 in this embodiment includes one or more of the following: a PSS, an SSS, and a channel state information-reference signal (CSI-RS); and the DsRS 2 includes one or more of the following: a PSS, an SSS, and a CSI-RS.

In the prior art, an occurrence period of a CSI-RS is defined, as shown in the following Table 1. That is, in the prior art, different occurrence periods $I_{CSI-RS}$ and locations $\Delta_{CSI-RS}$ in a period are configured for the CSI-RS.

TABLE 1

| CSI-RS subframe configuration $I_{CSI-RS}$ | CSI-RS period $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

In this embodiment, a CSI-RS defined in an existing protocol is used as the DsRS 1, and a CSI-RS with a longer period is used as the DsRS 2, as shown in the following Table 2. That is, the DsRS 2 appears at intervals with a longer period. Optionally, according to the existing protocol, a CSI-RS may have one to eight CSI-RS antenna ports, where the CSI-RS herein may be an antenna port associated with any part in the eight CSI-RSs. For example, one or two CSI-RS antenna ports may be used as the DSRS 1.

TABLE 2

| CSI-RS period $T_{CSI-RS}$ (subframes) |
|---|
| 100 |
| 200 |
| 400 |
| 800 |
| 1000 |

Certainly, a location at which the DsRS 2 appears in each period may be configured according to an offset $\Delta_{CSI-RS}$.

Figure 4E:
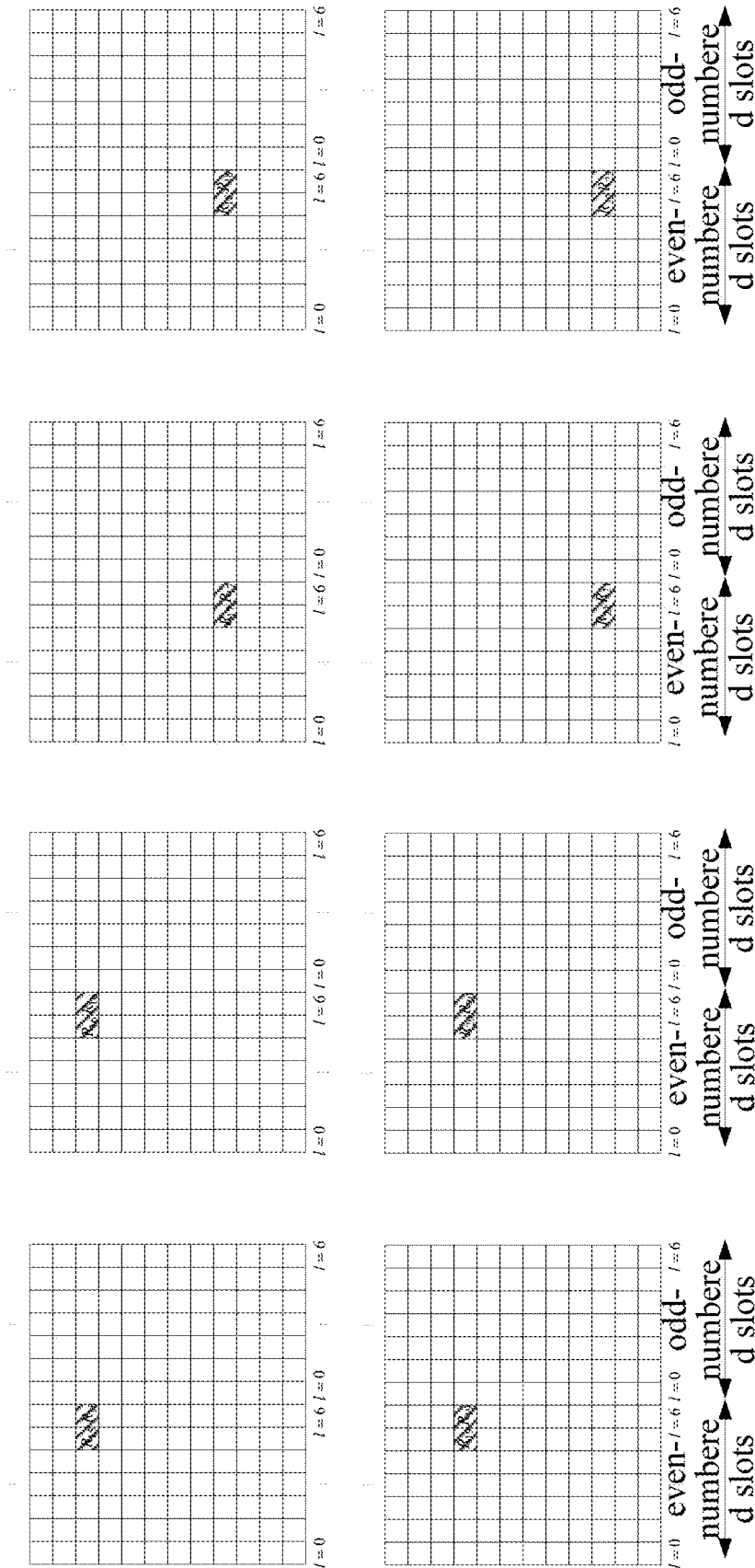
FIG. 4E is a schematic diagram of a CSI-RS mapping according to an embodiment of the present invention.

It should be noted that, the CSI-RS signals used as the DsRS 1 and the DsRS 2 need to be sent by using at least one or more CSI-RS antenna ports. FIG. 4E shows currently defined CSI-RS antenna ports.

Total CSI-RS antenna ports are ports 15 to 22, where in (15, 16), (17, 18), (19, 20), (21, 22), two different subcarriers are multiplexed separately according to a manner of a codebook.

Further, if the first transmit site (a sleep small cell) and the second transmit site (a serving cell) have a particular synchronization time deviation, that is, the sleep cell and the serving cell are not completely synchronized, while sending CSI-RS signals with two periods (for example, the first transmit period and the second transmit period), the sleep small cell also needs to send a synchronization signal (such as a PSS and/or an SSS) according to configuration periods of the two CSI-RSs. If the sleep small cell is completely synchronized with the serving cell, the sent DsRS 1 and DsRS 2 do not include a synchronization signal that needs to be sent together.

Figure 4F:
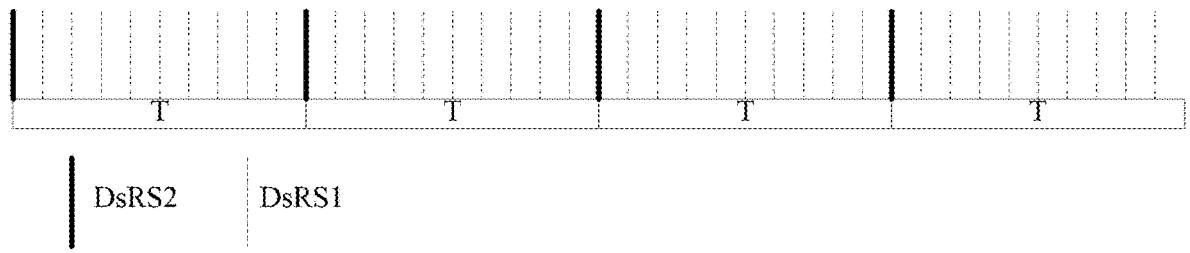
FIG. 4F is a schematic diagram of a time-domain location of a discovery reference signal according to an embodiment of the present invention.

In addition, FIG. 4F shows a schematic diagram of locations at which the DsRS 1 and DsRS 2 that are sent by the first transmit site appear in a time domain.

In an actual application, if there are multiple first transmit sites (that is, multiple sleep small cells), configuration information separately corresponding to DsRS 1 and DsRS 2 that are of the multiple first transmit sites should be made different as far as possible. For example, if both the DsRS 1 and the DsRS 2 include synchronization signals and CRSs, the CRSs are identified by using different cell IDs.

If both the DsRS 1 and the DsRS 2 include synchronization signals and CSI-RSs, locations at which different first transmit sites appear in subframes may be differently configured, or different first transmit sites are at different time-frequency locations in a same subframe. For example, when the DsRS 1 and the DsRS 2 are sent over a same time-frequency resource, it refers to that sending sequences are different. When the DsRS 1 and the DsRS 2 are sent over different time-frequency resources, it refers to that the DsRS 1 and the DsRS 2 are configured on different time-frequency resources.

Therefore, UE (earlier-version UE and new-version UE) may know at which frequencies, in which cells, and on which resources the signal quality measurement needs to be performed.

For example, the configuration information (for example, the configuration information 1 and configuration information 2) may include two parts: one part is information similar to mobility measurement information, and the other part is DsRS-related information. The two parts may be sent to UE as one message, or may be sent to UE as two different messages.

The mobility measurement information includes: frequency channel number information of a cell to be measured, a cell identity (Identity, ID for short) of the cell to be measured, subframe locations of an RSRP and RSRQ to be measured, and other information.

The DsRS-related information includes: a period of a discovery signal, an offset of the discovery signal, a resource indicator of the discovery signal, and other information.

According to the signal sending method in any one of the foregoing embodiments, a small cell in a sleep state, such as a Pico (a first transmit site), sends a specific small cell discovery reference signal, so that UE performs measurement; then the UE reports a measurement result to a serving cell (that is, a second transmit site); the serving cell sends the received measurement result to the sleep Pico; and the Pico decides, according to measurement information sent by each neighboring cell to the Pico, whether to switch from the sleep state to an operation state.

In addition, in a case, the sleep small cell transmits, to the serving cell, configuration information of the discovery signal of the sleep small cell. The configuration information is transmitted by using an interface between the small cell and the serving cell.

Figure 5:
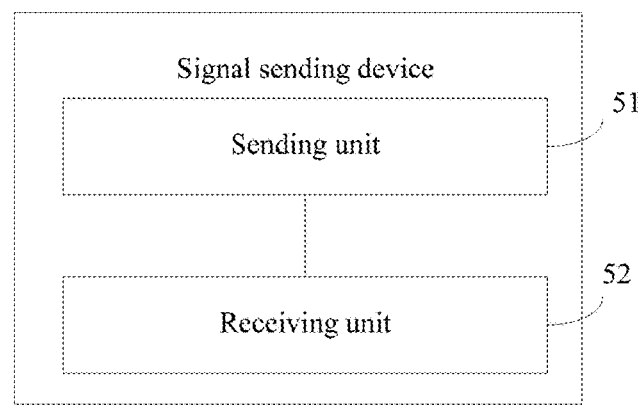
FIG. 5 is a schematic structural diagram of a signal sending device according to an embodiment of the present invention.

An embodiment of the present invention further provides a signal sending device, and as shown in FIG. 5, the signal sending device includes a sending unit 51 and a receiving unit 52.

The sending unit 51 is configured to send a DsRS 1 to first user equipment UE by using a first transmit power and a first transmit period, where the DsRS 1 is used by the first UE for signal quality measurement; and send a DsRS 2 to second user equipment UE by using a second transmit power and a second transmit period, where the DsRS 2 is used by the second UE for signal quality measurement.

The receiving unit 52 is configured to receive a first signal measurement result of the first UE for the DsRS 1, receive a second signal measurement result of the second UE for the DsRS 2, and determine, according to the first signal measurement result and the second signal measurement result, whether to switch an operation mode.

In a specific application, the sending unit 51 is further configured to send, to a second transmit site, configuration information 1 corresponding to the DsRS 1 and configuration information 2 corresponding to the DsRS 2, so that the second transmit site sends first configuration information to the first UE according to the configuration information 1, and sends second configuration information to the second UE according to the configuration information 2, and further, the first UE acquires the first signal measurement result according to the first configuration information and the DsRS 1, and the second UE acquires the second signal measurement result according to the second configuration information and the DsRS 2.

In another specific application, the receiving unit 52 is specifically configured to receive the first signal measurement result of the first UE and the second signal measurement result of the second UE that are sent by the second transmit site, where the second transmit site is a site that directly receives the first signal measurement result acquired by the first UE and receives the second signal measurement result acquired by the second UE.

For example, the DsRS 1 may include one or more of the following: a PSS, an SSS, and a CRS; and the DsRS 2 may include one or more of the following: a PSS, an SSS, and a CRS.

In another embodiment, the DsRS 1 may include one or more of the following: a PSS, an SSS, and a CSI-RS; and the DsRS 2 may include one or more of the following: a PSS, an SSS, and a CSI-RS.

In some cases, if the first UE is earlier-version UE, and the second UE is new-version UE, the first transmit period is less than or equal to the second transmit period, and/or, the first transmit power is less than or equal to the second transmit power.

For example, the first transmit period is 5 ms or 10 ms; and the second transmit period is 100 ms, 200 ms, 400 ms, 800 ms or 1000 ms.

Optionally, the first signal measurement result of the first UE includes one or more of the following:

an identifier of the first UE;

a measurement value of an RSRP acquired by the first UE corresponding to the identifier of the first UE;

a measurement value of RSRQ acquired by the first UE corresponding to the identifier of the first UE; and a measurement value of an RSSI acquired by the first UE corresponding to the identifier of the first UE; and the second signal measurement result of the second UE includes one or more of the following:

an identifier of the second UE;

a measurement value of an RSRP acquired by the second UE corresponding to the identifier of the second UE;

a measurement value of RSRQ acquired by the second UE corresponding to the identifier of the second UE; and a measurement value of an RSSI acquired by the second UE corresponding to the identifier of the second UE.

According to the signal sending device according in the foregoing embodiment of the present invention, a first discovery reference signal is sent to first UE, such as earlier-version UE, by using a first transmit power and a first transmit period, and a second discovery reference signal is sent to second UE, such as new-version UE, by using a second transmit power and a second transmit period, so that both the earlier-version UE and the new-version UE can receive the signals for performing signal quality measurement; and a first signal measurement result of the first UE is received and a second signal measurement result of the second UE is received, so that when on/off control of a small cell in the prior art is implemented according to the first signal measurement result and the second signal measurement result, a problem in the prior art can be resolved effectively, where the problem is that users cannot be offloaded to the small cell effectively and a throughput of a hotspot area including a relatively large quantity of first UEs and/or second UEs cannot be improved because on/off of the small cell cannot be controlled effectively.

In another embodiment, the foregoing signal sending device may include a processor and a memory, where the memory is coupled to the processor, and the memory is configured to store a program executed by the processor; and the processor is specifically configured to:

send a DsRS 1 to first user equipment UE by using a first transmit power and a first transmit period, where the DsRS 1 is used by the first UE for signal quality measurement; and send a DsRS 2 to second UE by using a second transmit power and a second transmit period, where the DsRS 2 is used by the second UE for signal quality measurement; and receive a first signal measurement result of the first UE for the DsRS 1, receive a second signal measurement result of the second UE for the DsRS 2, and determine, according to the first signal measurement result and the second signal measurement result, whether to switch an operation mode.

In some cases, the processor is further configured to send, to a second transmit site, configuration information 1 corresponding to the DsRS 1 and configuration information 2 corresponding to the DsRS 2, so that the second transmit site sends first configuration information to the first UE according to the configuration information 1, and sends second configuration information to the second UE according to the configuration information 2, and further, the first UE acquires the first signal measurement result according to the first configuration information and the DsRS 1, and the second UE acquires the second signal measurement result according to the second configuration information and the DsRS 2.

In addition, the processor is specifically configured to receive the first signal measurement result of the first UE and the second signal measurement result of the second UE that are sent by the second transmit site, where the second transmit site is a site that directly receives the first signal measurement result acquired by the first UE and receives the second signal measurement result acquired by the second UE.

The signal sending device in the foregoing embodiment can effectively resolve a problem that users cannot be offloaded to a small cell effectively and a throughput of a hotspot area including a relatively large quantity of first UEs and/or second UEs cannot be improved because on/off of the small cell cannot be controlled effectively in the prior art.

Figure 6:
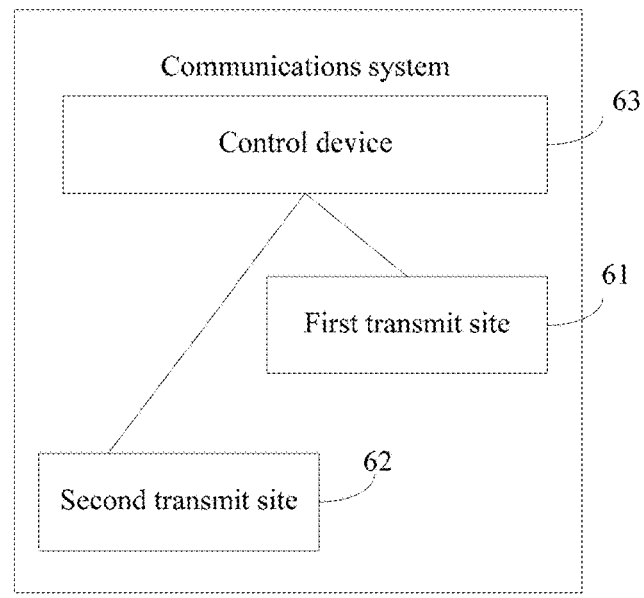
FIG. 6 is a schematic structural diagram of a communications system according to an embodiment of the present invention.

An embodiment of the present invention further provides a communications system, and as shown in FIG. 6, the communications system includes a first transmit site 61, a second transmit site 62, and a control device 63.

The first transmit site 61 is configured to send a DsRS 1 to first user equipment UE by using a first transmit power and a first transmit period, where the DsRS 1 is used by the first UE for signal quality measurement; and send a DsRS 2 to second UE by using a second transmit power and a second transmit period, where the DsRS 2 is used by the second UE for signal quality measurement.

The control device 63 is configured to receive, from the second transmit site, a first signal measurement result of the first UE for the DsRS 1, and a second signal measurement result of the second UE for the DsRS 2; and the control device determines, according to the first signal measurement result and the second signal measurement result, whether to switch an operation mode of the first transmit site, where the second transmit site 62 is a site that directly receives the first signal measurement result acquired by the first UE and receives the second signal measurement result acquired by the second UE.

Optionally, the control device 63 is further configured to: before the first transmit site sends the DsRS 1 to the first UE by using the first transmit power and the first transmit period, separately send, to the first transmit site and the second transmit site, configuration information 1 corresponding to the DsRS 1, and separately send, to the first transmit site and the second transmit site, configuration information 2 corresponding to the DsRS 2.

The second transmit site 62 is further configured to send first configuration information to the first UE according to the configuration information 1, and send second configuration information to the second UE according to the configuration information 2, so that the first UE acquires the first signal measurement result according to the first configuration information and the DsRS 1, and the second UE acquires the second signal measurement result according to the second configuration information and the DsRS 2.

Correspondingly, that the first transmit site 61 sends the DsRS 1 to the first UE by using the first transmit power and the first transmit period includes:

sending, by the first transmit site 61 according to the configuration information 1, the DsRS 1 to the first UE by using the first transmit power and the first transmit period; and that the first transmit site 61 sends the DsRS 2 to the second UE by using the second transmit power and the second transmit period includes:

sending, by the first transmit site 61 according to the configuration information 2, the DsRS 2 to the second UE by using the second transmit power and the second transmit period.

For example, the DsRS 1 may include one or more of the following: a PSS, an SSS, and a CRS; and the DsRS 2 may include one or more of the following: a PSS, an SSS, and a CRS.

In other embodiments, the DsRS 1 may include one or more of the following: a PSS, an SSS, and a CSI-RS; and the DsRS 2 may include one or more of the following: a PSS, an SSS, and a CSI-RS.

In addition, if the first UE is earlier-version UE, and the second UE is new-version UE, the first transmit period is less than or equal to the second transmit period, and/or, the first transmit power is less than or equal to the second transmit power.

For example, the first transmit period may be 5 ms or 10 ms; and the second transmit period may be 100 ms, 200 ms, 400 ms, 800 ms, or 1000 ms.

Particularly, the first signal measurement result of the first UE includes one or more of the following:

an identifier of the first UE;

a measurement value of an RSRP acquired by the first UE corresponding to the identifier of the first UE;

a measurement value of RSRQ acquired by the first UE corresponding to the identifier of the first UE; and a measurement value of an RSSI acquired by the first UE corresponding to the identifier of the first UE; and the second signal measurement result of the second UE includes one or more of the following:

an identifier of the second UE;

a measurement value of an RSRP acquired by the second UE corresponding to the identifier of the second UE;

a measurement value of RSRQ acquired by the second UE corresponding to the identifier of the second UE; and a measurement value of an RSSI acquired by the second UE corresponding to the identifier of the second UE.

The communications system in this embodiment may include multiple first transmit sites, multiple second transmit sites, and the like. The second transmit site may be a pico base station, or may be a macro base station, which is not limited in this embodiment of the present invention.

In the communications system according to the foregoing embodiment, a signal sending device is controlled by a control device; the signal sending device sends a first discovery reference signal to first UE, such as earlier-version UE, by using a first transmit power and a first transmit period, and sends a second discovery reference signal to second UE, such as new-version UE, by using a second transmit power and a second transmit period, so that both the earlier-version UE and the new-version UE can receive the signals for performing signal quality measurement; and the signal sending device receives a first signal measurement result of the first UE and receives a second signal measurement result of the second UE, so that when on/off control of a small cell in the prior art is implemented according to the first signal measurement result and the second signal measurement result, a problem in the prior art can be resolved effectively, where the problem is that users cannot be offloaded to the small cell effectively and a throughput of a hotspot area including a relatively large quantity of first UEs and/or second UEs cannot be improved because on/off of the small cell cannot be controlled effectively.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A signal sending method comprising:
sending, by a first transmit site, a first discovery reference signal (DsRS 1) to first user equipment (UE) by using a first transmit power and a first transmit period, wherein the first discovery reference signal is used by the first UE for signal quality measurement;
sending, by the first transmit site, a second discovery reference signal (DsRS 2) to second UE by using a second transmit power and a second transmit period, wherein the second discovery reference signal is used by the second UE for signal quality measurement;
receiving, by a second transmit site, a first signal measurement result of the first UE for the first discovery reference signal, and a second signal measurement result of the second UE for the second discovery reference signal;

sending, by the second transmit site, the first signal measurement result of the first UE and the second signal measurement result of the second UE to the first transmit site; and determining, by the second transmit site, whether to switch an operation mode of the first transmit site according to the first signal measurement result and the second signal measurement result, wherein the first transmit site is in a sleeping mode.

2. The method according to claim 1, before receiving the first and second signal measurement results, the method further comprising:

sending, by the first transmit site to the second transmit site, configuration information (A) corresponding to the DsRS 1, and configuration information (B) corresponding to the DsRS 2; and sending, by the second transmit site, first configuration information to the first UE according to the configuration information (A), and sending second configuration information to the second UE according to the configuration information B.

3. The method according to claim 1, before sending the DsRS 1 to the first UE, the method further comprising:

separately sending, by a control device to the first transmit site and the second transmit site, configuration information (A) corresponding to the DsRS 1, and separately sending, to the first transmit site and the second transmit site, configuration information (B) corresponding to the DsRS 2; and correspondingly, sending, by the second transmit site, first configuration information to the first UE according to the configuration information (A), and sending second configuration information to the second UE according to the configuration information (B);

wherein sending the DsRS 1 to the first UE comprises sending, by the first transmit site according to the configuration information (A), the DsRS 1 to the first UE by using the first transmit power and the first transmit period; and wherein sending the DsRS 2 to the second UE comprises sending, by the first transmit site according to the configuration information (B), the DsRS 2 to the second UE by using the second transmit power and the second transmit period.

4. The method according to claim 1, wherein the DsRS 1 comprises one or more of the following:
a) a primary synchronization signal (PSS),
b) a secondary synchronization signal (SSS), and
c) a cell-specific reference signal (CRS), and
the DsRS 2 comprises one or more of the PSS, the SSS, and the CRS;
or,
the DsRS 1 comprises one or more of the following:
a) a primary synchronization signal PSS,
b) a secondary synchronization signal SSS, and
c) a channel state information-reference signal CSI-RS, and
the DsRS 2 comprises one or more of the PSS, the SSS, and the CSI-RS.

5. The method according to claim 1, wherein the first UE is a UE version no later than Rel-11, and the second UE is a UE version later than Rel-11, and
the first transmit period is less than or equal to the second transmit period,
and/or
the first transmit power is less than or equal to the second transmit power.

6. The method according to claim 5, wherein the first transmit period is 5 ms or 10 ms and the second transmit period is 100 ms, 200 ms, 400 ms, 800 ms, or 1000 ms.

7. The method according to claim 1, wherein the first signal measurement result of the first UE comprises one or more of the following:
a) an identifier of the first UE;
b) a measurement value of a reference signal received power (RSRP) acquired by the first UE corresponding to the identifier of the first UE;
c) a measurement value of reference signal received quality (RSRQ) acquired by the first UE corresponding to the identifier of the first UE; and
d) a measurement value of a received signal strength indicator (RSSI) acquired by the first UE corresponding to the identifier of the first UE; and
the second signal measurement result of the second UE comprises one or more of the following:
a) an identifier of the second UE;
b) a measurement value of an RSRP acquired by the second UE corresponding to the identifier of the second UE;
c) a measurement value of RSRQ acquired by the second UE corresponding to the identifier of the second UE; and
d) a measurement value of an RSSI acquired by the second UE corresponding to the identifier of the second UE.

8. A communication system comprising:
a first transmit site and a second transmit site, wherein the first transmit site is configured to:
a) send a first discovery reference signal (DsRS 1) to first user equipment (UE) by using a first transmit power and a first transmit period, wherein the first discovery reference signal is used by the first UE for signal quality measurement and
b) send a second discovery reference signal (DsRS 2) to second UE by using a second transmit power and a second transmit period, wherein the second discovery reference signal is used by the second UE for signal quality measurement; and
the second transmit site is configured to:
a) receive a first signal measurement result of the first UE for the first discovery reference signal, receive a second signal measurement result of the second UE for the second discovery reference signal;
b) send the first signal measurement result of the first UE and the second signal measurement result of the second UE to the first transmit site; and
determine, according to the first signal measurement result and the second signal measurement result, whether to switch an operation mode of the first transmit site,
wherein the first transmit site is in a sleeping mode.

9. The communication system according to claim 8, wherein the first transmit site is further configured to:
send, to the second transmit site, configuration information (A) corresponding to the DsRS 1 and configuration information (B) corresponding to the DsRS 2; and
the second transmit site is further configured to:
send first configuration information to the first UE according to the configuration information (A), and
send second configuration information to the second UE according to the configuration information (B).

10. The communication system according to claim 9, wherein the second transmit site is configured to send the first signal measurement result of the first UE and the second signal measurement result of the second UE to the first transmit site.

11. The communication system according to claim 8, wherein the DsRS 1 comprises one or more of the following:
   a) a primary synchronization signal (PSS),
   b) a secondary synchronization signal (SSS), and
   c) a cell-specific reference signal (CRS), and
   the DsRS 2 comprises one or more of the PSS, the SSS, and the CRS;
   or,
   the DsRS 1 comprises one or more of the following:
   a) a primary synchronization signal (PSS),
   b) a secondary synchronization signal (SSS), and
   c) a channel state information-reference signal (CSI-RS), and
   the DsRS 2 comprises one or more of the PSS, the SSS, and the CSI-RS.

12. The communication system according to claim 8, wherein the first UE is a UE version no later than Rel-11, and the second UE is a UE version later than Rel-11, and
   the first transmit period is less than or equal to the second transmit period,
   and/or
   the first transmit power is less than or equal to the second transmit power.

13. The communication system according to claim 12, wherein the first transmit period is 5 ms or 10 ms and the second transmit period is 100 ms, 200 ms, 400 ms, 800 ms, or 1000 ms.

14. The communication system according to claim 8, wherein the first signal measurement result of the first UE comprises one or more of the following:
   a) an identifier of the first UE;
   b) a measurement value of a reference signal received power (RSRP) acquired by the first UE corresponding to the identifier of the first UE;
   c) a measurement value of reference signal received quality (RSRQ) acquired by the first UE corresponding to the identifier of the first UE; and
   d) a measurement value of a received signal strength indicator (RSSI) acquired by the first UE corresponding to the identifier of the first UE; and
   the second signal measurement result of the second UE comprises one or more of the following:
   a) an identifier of the second UE;
   b) a measurement value of an RSRP acquired by the second UE corresponding to the identifier of the second UE;
   c) a measurement value of RSRQ acquired by the second UE corresponding to the identifier of the second UE; and
   d) a measurement value of an RSSI acquired by the second UE corresponding to the identifier of the second UE.

15. A communication system comprising a first transmit site, a second transmit site, and a control device, wherein the first transmit site is configured to:
   a) send a first discovery reference signal (DsRS 1) to first user equipment (UE) by using a first transmit power and a first transmit period, wherein the first discovery reference signal is used by the first UE for signal quality measurement; and
   b) send a second discovery reference signal (DsRS 2) to second UE by using a second transmit power and a second transmit period, wherein the second discovery reference signal is used by the second UE for signal quality measurement;
   the control device is configured to:
   a) receive, from the second transmit site, a first signal measurement result of the first UE for the first discovery reference signal, and a second signal measurement result of the second UE for the second discovery reference signal; and
   b) determine, according to the first signal measurement result and the second signal measurement result, whether to switch an operation mode of the first transmit site; and
   wherein the second transmit site is a site configured to:
   a) directly receive the first signal measurement result of the first UE and receive the second signal measurement result of the second UE; and
   b) send the first signal measurement result of the first UE and the second signal measurement result of the second UE to the first transmit site.

16. The communication system according to claim 15, wherein the control device is further configured to:
   before the first transmit site sends the DsRS 1 to the first UE by using the first transmit power and the first transmit period,
   a) separately send, to the first transmit site and the second transmit site, configuration information (A) corresponding to the DsRS 1, and
   b) separately send, to the first transmit site and the second transmit site, configuration information 2 corresponding to the DsRS 2; and
   the second transmit site is further configured to send first configuration information to the first UE according to the configuration information (A), and send second configuration information to the second UE according to the configuration information (B); and
   the first transmit site is further configured to:
   a) send according to the configuration information (A), the DsRS 1 to the first UE by using the first transmit power and the first transmit period; and
   b) send according to the configuration information (B), the DsRS 2 to the second UE by using the second transmit power and the second transmit period.

17. The communication system according to claim 15, wherein the DsRS 1 comprises one or more of the following:
   a) a primary synchronization signal (PSS),
   b) a secondary synchronization signal (SSS), and
   c) a cell-specific reference signal (CRS), and
   the DsRS 2 comprises one or more of the PSS, the SSS, and the CRS;
   or,
   the DsRS 1 comprises one or more of the following:
   a) a primary synchronization signal PSS,
   b) a secondary synchronization signal SSS, and
   c) a channel state information-reference signal CSI-RS, and
   the DsRS 2 comprises one or more of the PSS, the SSS, and the CSI-RS.

18. The communication system according to claim 15, wherein the first UE is a UE version no later than Rel-11, and the second UE is a UE version later than Rel-11, and
   the first transmit period is less than or equal to the second transmit period,
   and/or
   the first transmit power is less than or equal to the second transmit power.

19. The communication system according to claim 15, wherein the first signal measurement result of the first UE comprises one or more of the following:
   a) an identifier of the first UE;
   b) a measurement value of a reference signal received power (RSRP) acquired by the first UE corresponding to the identifier of the first UE;
   c) a measurement value of reference signal received quality (RSRQ) acquired by the first UE corresponding to the identifier of the first UE; and
   d) a measurement value of a received signal strength indicator (RSSI) acquired by the first UE corresponding to the identifier of the first UE; and
the second signal measurement result of the second UE comprises one or more of the following:
   a) an identifier of the second UE;
   b) a measurement value of an RSRP acquired by the second UE corresponding to the identifier of the second UE;
   c) a measurement value of RSRQ acquired by the second UE corresponding to the identifier of the second UE; and
   d) a measurement value of an RSSI acquired by the second UE corresponding to the identifier of the second UE.

* * * * *